United States Patent [19]
Iwasaki

[11] Patent Number: 5,912,930
[45] Date of Patent: Jun. 15, 1999

[54] PHASE SHIFT KEYING SIGNAL DEMODULATION METHOD AND DEVICE

[75] Inventor: Motoya Iwasaki, Tokyo, Japan

[73] Assignee: NEC Corporation, Tokyo, Japan

[21] Appl. No.: 08/825,764

[22] Filed: Apr. 1, 1997

[30] Foreign Application Priority Data

Apr. 8, 1996 [JP] Japan ..................................... 8-084971

[51] Int. Cl.⁶ .......................... H04L 27/22; H04L 27/152; H03D 3/22; H03D 3/00
[52] U.S. Cl. .......................... 375/329; 375/326; 375/327; 329/304; 329/307
[58] Field of Search .................................... 375/329, 326, 375/327, 332, 324, 373, 376, 371; 329/304, 306, 307

[56] References Cited

U.S. PATENT DOCUMENTS

| | | | |
|---|---|---|---|
| 5,090,027 | 2/1992 | Ohsawa | 375/326 |
| 5,268,647 | 12/1993 | Ichiyoshi | 375/326 |

FOREIGN PATENT DOCUMENTS 2280552  11/1990  Japan .

OTHER PUBLICATIONS

T. Ohsawa et al.; "Performance Evaluation of a Mobile Satellite System Modem using an ALE Method"; International Mobile Satellite Conference, Ottawa, 1990, pp. 511–515.

*Primary Examiner*—Stephen Chin
*Assistant Examiner*—Betsy L. Deppe
*Attorney, Agent, or Firm*—Whitham, Curtis & Whitham

[57] ABSTRACT

The invention provides a PSK signal demodulation device of small circuit scale that is capable of both rapid synchronization pull-in and stable demodulation operation following demodulation synchronization pull-in. To achieve these capabilities, the phase shift keying signal demodulation device of this invention is provided with an adaptive line enhancer demodulation circuit, a PLL demodulation circuit, and a switching circuit that switches the demodulation circuits from the adaptive line enhancer demodulation circuit to the PLL demodulation circuit. The switching circuit switches between the demodulation circuits such that, upon start of input of an N-phase PSK signal, demodulation is effected by the adaptive line enhancer demodulation circuit until phase synchronization is established between the input N-phase PSK signal and the recovered carrier, and demodulation is effected by the PLL demodulation circuit after establishment of phase synchronization.

4 Claims, 4 Drawing Sheets

PHASE SHIFT KEYING SIGNAL DEMODULATION METHOD AND DEVICE

BACKGROUND OF THE INVENTION

1. Field of the Invention

The present invention relates to a PSK (Phase Shift Keying) signal demodulation method as well as a device for realizing the method, and in particular, to a PSK signal modulation method and device for cases such as satellite communication that require both highly stable demodulation operation as well as high-speed synchronized pull-in characteristics over a broad frequency range under low C/N (Carrier-to-Noise ratio) conditions.

2. Description of the Related Art

FIG. 1 is a block diagram showing a PSK signal demodulator of the prior art. An inputted N-phase PSK signal (N-PSK signal) R(t) is first N-frequency multiplied at N-frequency multiplier 1 to eliminate the modulation component, and a signal having a frequency N times the carrier frequency is outputted from N-frequency multiplier 1. Adaptive line enhancer 2 has the characteristic of a narrow-band band pass filter adapted to the line of the signal of the output of N-frequency multiplier 1, and accordingly, when a line signal is inputted, adaptive line enhancer 2 allows its frequency component to pass. The noise component from the output of N-frequency multiplier 1 is eliminated from the output of adaptive line enhancer 2, and the output therefore becomes a signal in which the unmodulated signal, i.e., the line component, is emphasized. Phase detector 3 generates phase signal $\theta_A$ which corresponds to the phase angle of the output of adaptive line enhancer 2. Differentiator 4 differentiates phase signal $\theta_A$, and converts it to angular frequency signal $\omega_N$. Multiplier 5 multiplies angular frequency signal $\omega_N$ by 1/N and generates recovered carrier angular frequency $\omega_R$. Integrator 7 integrates recovered carrier angular frequency $\omega_R$ and calculates phase angle $\theta_S$ of the recovered carrier. Phase angle $\theta_S$ is then converted to a –sin function value by –sin converter 8 and a cos function value by cos converter 9.

The operation of the circuit from phase detector 3 to multiplier 5 corresponds to the N frequency division of the frequency, and accordingly, the outputs of –sin converter 8 and cos converter 9 can be used as a recovered carrier for demodulation.

Complex multiplier 10 multiplies the complex-indicated outputs of –sin converter 8 and cos converter 9 by complex-indicated input signal R(t) and generates demodulated signal D(t).

FIG. 2 is a signal waveform diagram illustrating the operation of each circuit component of the PSK signal demodulation circuit shown in FIG. 1. The PSK signal demodulator shown in FIG. 1 operates as follows:

Following receptions inputted N-phase PSK signal R(t) is an asynchronous quadrature detected (i.e., quasi-coherent detected) signals and accordingly, is made up of an in-phase component series and a quadrature-phase component series.

The quasi-coherent detected N-phase PSK signal R(t) can be represented by a complex number as shown in equation (1) below:

$$R(t)=\exp[j\{(2\pi k(t)/N)+\theta(t)\}]+z(t) \tag{1}$$

where z(t) is the noise component, k(t) is an integer $0 \leq k < N$, and $\theta(t)$ is phase error.

When this signal is N-frequency multiplied at N-frequency multiplier 1, the output M(t) becomes the unmodulated signal as shown in equation (2):

$$M(t)=R(t)^N=\exp[jN\theta(t)]+z'(t) \tag{2}$$

The output of adaptive line enhancer 2 becomes signal A(t) in which noise component z'(t) is eliminated from M(t) as shown in equation (3):

$$A(t)=\exp[jN\theta(t)] \tag{3}$$

Phase detector 3 outputs signal $\theta_A(t)$, which corresponds to the phase of signal A(t):

$$\theta A(t)=N\theta(t) \tag{4}$$

After this signal is time-differentiated at differentiator 4, the signal $\omega_R(t)$ multiplied by 1/N at multiplier 5 is as shown in equation (5):

$$\omega_R(t)=d\theta(t)/dt \tag{5}$$

The output of multiplier 5 is outputted to integrator 7. The output $\theta_S(t)$ of integrator 7 is as shown in equation (6), from which it can be seen that the carrier phase is recovered:

$$\theta_S(t)=\int \omega_R(t)\,dt \tag{6}$$

The output $\theta_S(t)$ of integrator 7 is inputted to –sin converter 8 and cos converter 9. If the output of cos converter is represented as a real part and the output of –sin converter is represented as an imaginary part, the output C(t) of –sin converter 8 and cos converter 9 are as shown in equation (7):

$$C(t)=\cos\theta(t)-j\sin\theta(t)=\exp[-j\theta(t)] \tag{7}$$

Multiplying this result by input signal R(t) at complex multiplier 10 produces the result shown in equation (8):

$$D(t)=R(t)C(t)=\exp[j2\pi k(t)/N]+z(t)\exp[-j\theta(t)] \tag{8}$$

A phase-synchronized demodulated signal can be obtained.

Because adaptive line enhancer 2 has not yet adapted to input immediately following the start of input of signal R(t), output does not accord with the output shown in equation (3) and the output of complex multiplier 10 is not phase-synchronized, but adaptive line enhancer 2 adapts to input quickly and phase synchronization is established.

Due to the employment of an adaptive line enhancer, the PSK signal modulation device of the above-described prior art offers the advantage of high-speed demodulation synchronization capabilities even in cases in which the frequency offset of the input signal is large. However, the use of N-frequency multiplication to effect carrier recovery carries with it the drawback of degradation of the signal-to-noise ratio of the input signal to the adaptive line enhancer.

To improve the signal-to-noise ratio of the recovered carrier, the bandwidth of the band-pass filter formed at the adaptive line enhancer must be restricted. As is known in the art, the number of taps of the FIR [Finite Impulse Response] adaptive filter must be increased to narrow the bandwidth of the adaptive line enhancer, but this increase brings about a considerable increase in the circuit scale of the FIR adaptive filter. Thus, improvement of the signal-to-noise ratio of the carrier entails greatly increased circuit scale. On the other hand, limiting the scale of the circuit brings about a drop in the signal-to-noise ratio of the carrier as well as the occurrence of cycle slips and so forth in the demodulated signal, and stable demodulation operation therefore cannot be obtained Thus, while a PSK signal demodulation device of the prior art employs an adaptive line enhancer to obtain a high-speed demodulation synchronization pull-in characteristic, such a construction necessitates an extremely large-scale circuit if stable demodulation operation is to be attempted after demodulation synchronization.

SUMMARY OF THE INVENTION

The present invention was developed in view of the above-described problem, and has the object of providing a PSK signal demodulation device that allows rapid demodulation synchronization pull-in with a relatively small circuit scale, and moreover, that enables stable demodulation operation after achieving demodulation synchronization pull-in.

(1) To achieve the above-described object, the present invention proposes a phase shift keying signal demodulation method:

in which a demodulated signal is recovered from an input N-phase PSK signal by first recovering the carrier using a first carrier recovery method until phase synchronization is established between the input N-phase PSK signal and the recovered carrier, and switching to a second carrier recovery method to recover the carrier after establishing the phase synchronization; wherein the first carrier recovery method includes processes in which: the input N-phase PSK signal is N-frequency multiplied to eliminate the modulation component, the N-frequency multiplied signal is passed through a band-pass filter adapted to the line component of the signal to generate an adaptive line enhanced signal in which the line component is enhanced, the adaptive line enhanced signal is N-frequency divided to generate a recovered carrier angular frequency signal that indicates an angular frequency of a recovered carrier, the recovered carrier angular frequency signal is integrated to calculate a phase angle of the recovered carrier for demodulation use, and a −sin function value and a cos function value corresponding to the phase angle are calculated to generate a recovered carrier for demodulation;

and in which the second carrier recovery method includes processes in which: a phase error signal that indicates the residual phase error of the demodulated signal is generated; a proportional operation is executed in which the phase error signal is multiplied by a first constant, and an integration operation is executed in which the phase error signal is multiplied by a second constant and the multiplication result of multiplication by the second constant is integrated using as an initial value the angular frequency generated by the first carrier recovery method when switching from the first carrier recovery method to the second carrier recovery method; a proportional integration operation is executed in which the proportional operation result and the integration operation result are added; the result of the proportional integration operation is made the recovered carrier angular frequency signal, and the recovered carrier angular frequency signal is integrated to calculate the phase angle of the recovered carrier for demodulation; and a −sin function value and cos function value corresponding to the phase angle are calculated to generate a recovered carrier.

The first carrier recovery method is an adaptive line enhancing carrier recovery method and enables high-speed synchronized pull-in over a broad frequency range. The second carrier recovery method is a PLL carrier recovery method that includes a proportional integration operation. As is known in the art, A PLL that does not include a loop filter is a primary loop. The proportional integration operation corresponds to a primary filter, and accordingly, a PLL that includes a proportional integration operation element is a secondary loop. The above-described proportional integration operation further includes multiplication processes by first and second constants, and as a result, the second carrier recovery method corresponds to the operation of a secondary loop that includes the first and second constants as parameters. Accordingly, by appropriately selecting the values of the first and second constants, the loop band can be set as narrow as desired without necessitating a large-scale circuit. This process provides the stabilized operation which is one of the advantages of a PLL containing a proportional integration filter.

Finally, when switching from the first carrier recovery method to the second carrier recovery method in the phase shift keying signal demodulation method of the present invention, processing by the second carrier recovery method may begin in a state of established demodulation synchronization from the start because the second carrier recovery method demodulates using as initial value an angular frequency generated by the first carrier recovery method.

Thus, a stable demodulation can be realized on a narrow loop band by effecting broad-band synchronized pull-in at high speed by a first carrier recovery method upon initial input of a phase shift keying signal, and employing a second carrier recovery method after demodulation synchronization is established However, the synchronized pull-in frequency range is narrow in a PLL demodulation circuit, resulting in an extremely long time interval before synchronization, and as a result, control is effected to load to the PLL demodulation circuit the information that is obtained in the pull-in process required for demodulation, so as to maintain demodulation synchronization even immediately following switching to the PLL carrier recovery method. For this reason, when switching from the first carrier recovery method to the second carrier recovery method, the angular frequency generated by the first carrier recovery method is used as the initial value when starting the second carrier recovery method. In this way, discontinuity in demodulation synchronization can be prevented.

(2) The phase shift keying signal demodulation device of the present invention:

includes a first phase shift keying signal demodulation circuit, a second phase shift keying signal demodulation circuit, and switching means for switching between the first and second phase shift keying signal demodulation circuits, wherein:

the first phase shift keying signal demodulation circuit includes an N-frequency multiplier that N-frequency multiplies the angular frequency of an inputted N-phase PSK signal, an adaptive line enhancer that adapts to the line component of the output of the N-frequency multiplier and outputs a signal in which the line component is enhanced, a phase detector that detects the phase of the output of the adaptive line enhancer, a differentiator that differentiates the output of the phase detector, frequency dividing means that multiplies the output of the differentiator by 1/N and generates a recovered carrier angular frequency signal corresponding to the angular frequency of the recovered carrier, an integrator that adds the recovered carrier angular frequency signal for every clock signal and outputs the result as the phase angle of the recovered carrier for every clock signal, a sin-cos converter that converts the output of the integrator to a −sin function value and a cos function value, and a complex multiplier that represents the output of the sin-cos converter and the inputted N-phase PSK signal as complex numbers, multiplies, and outputs a demodulation signal;

the second phase shift keying signal demodulation circuit shares the integrator, the sin-cos converter, and the complex multiplier with the first phase shift keying signal demodulation circuit;

and moreover, includes:

a phase error detector that inputs the demodulation signal and outputs a phase error signal corresponding to the residual phase error of the demodulation signal;

and a proportional integration filter that inputs the phase error signal, executes a proportional operation in which the phase error signal is multiplied by a first constant, and an integration operation in which the phase error signal is multiplied by a second constant and the multiplication result of multiplying by the second constant is integrated using as initial value the angular frequency generated by the first phase shift keying signal demodulation circuit when switching from the first phase shift keying signal demodulation circuit to the second phase shift keying signal demodulation circuit, executes a proportional integration operation in which the result of the proportional operation and the result of the integration operation are added, and outputs the result of this proportional integration operation to the integrator as a recovered carrier angular frequency signal; and wherein the switching means switches the first and second phase shift keying signal demodulation circuits such that, upon initial input of the N-phase PSK signal, demodulation is effected by the first phase shift keying signal demodulation circuit until phase synchronization is established between the inputted N-phase PSK signal and the recovered carrier, and demodulation is effected by the second phase shift keying signal demodulation circuit following establishment of the phase synchronization.

The first phase shift keying signal demodulation circuit is a circuit that demodulates using a first carrier recovery method. The second phase shift keying signal demodulation circuit is a circuit that demodulates using the second carrier recovery method. The switching means is device that switches the demodulation circuit from the first phase shift keying signal demodulation circuit to the second phase shift keying signal demodulation circuit.

(3) The switching means may be composed of a synchronization judgment control circuit and a first selection means. The synchronization judgment control circuit inputs the demodulation signal, judges establishment of phase synchronization between the N-phase PSK signal inputted to the phase shift keying signal demodulation device and the recovered carrier, and when phase synchronization is established, outputs a switching control signal after the passage of a prescribed interval following the establishment of synchronization. In response to the switching control signal, the first selection means connects to the integrator either the output of the frequency dividing means of the first phase shift keying signal demodulation circuit or the output of the proportional integration filter of the second phase shift keying signal demodulation circuit.

(4) The second phase shift keying signal demodulation circuit may be composed of an averaging circuit, and the proportional integration filter may be composed of a second selection means. The averaging circuit time-averages the output of the frequency dividing means of the first phase shift keying signal demodulation circuit. The second selection means connects the output of the averaging circuit to the proportional integration filter as the initial value when a switching control signal is outputted from the synchronization judgment control circuit.

As described in the foregoing explanation, this device is directed toward realizing the phase shift keying signal demodulation method of the present invention, and operates in the same way as phase shift keying signal demodulation method.

The present invention thus employs an adaptive line enhancing demodulation circuit that exhibits high-speed and broad-band pull-in characteristics to perform demodulation in the demodulation synchronization pull-in process, and after demodulation synchronization, switches to a PLL demodulation circuit that offers highly stable demodulation with a small-scale circuit structure; and by loading phase and frequency information obtained in the demodulation synchronization pull-in process to the PLL demodulation circuit, the present invention allows execution of high-speed and broad-band demodulation synchronization without a greatly enlarged circuit scale at the time of demodulation synchronization pull-in, and following demodulation synchronization, allows restriction of the loop band to provide highly stable demodulation, thus allowing a significant reduction in circuit scale.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

An embodiment of the present invention will next be described with reference to the accompanying figures.

Construction

Figure 1:
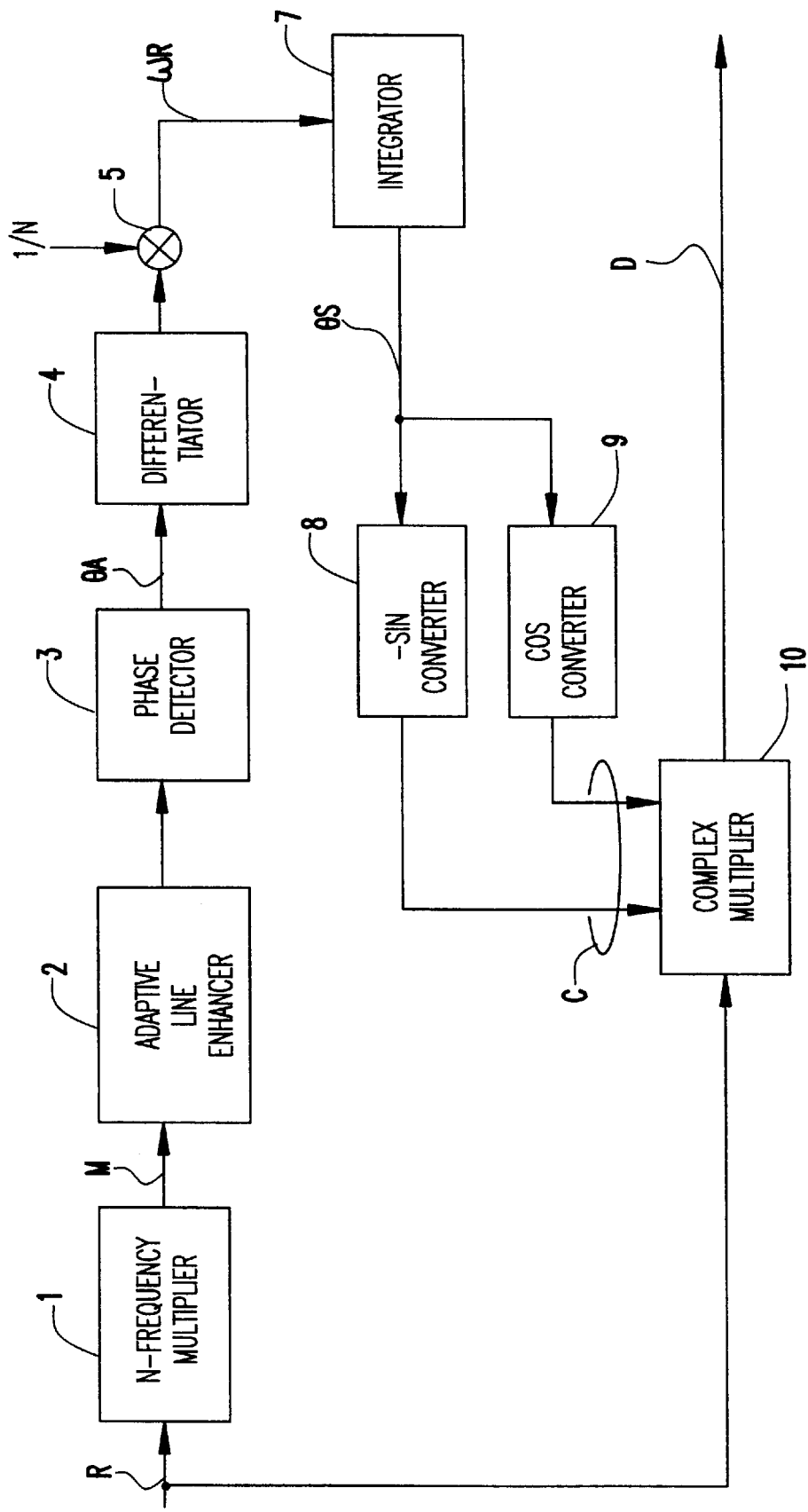
FIG. 1 is a block diagram showing a phase shift keying signal demodulator of the prior art.
Figure 2:
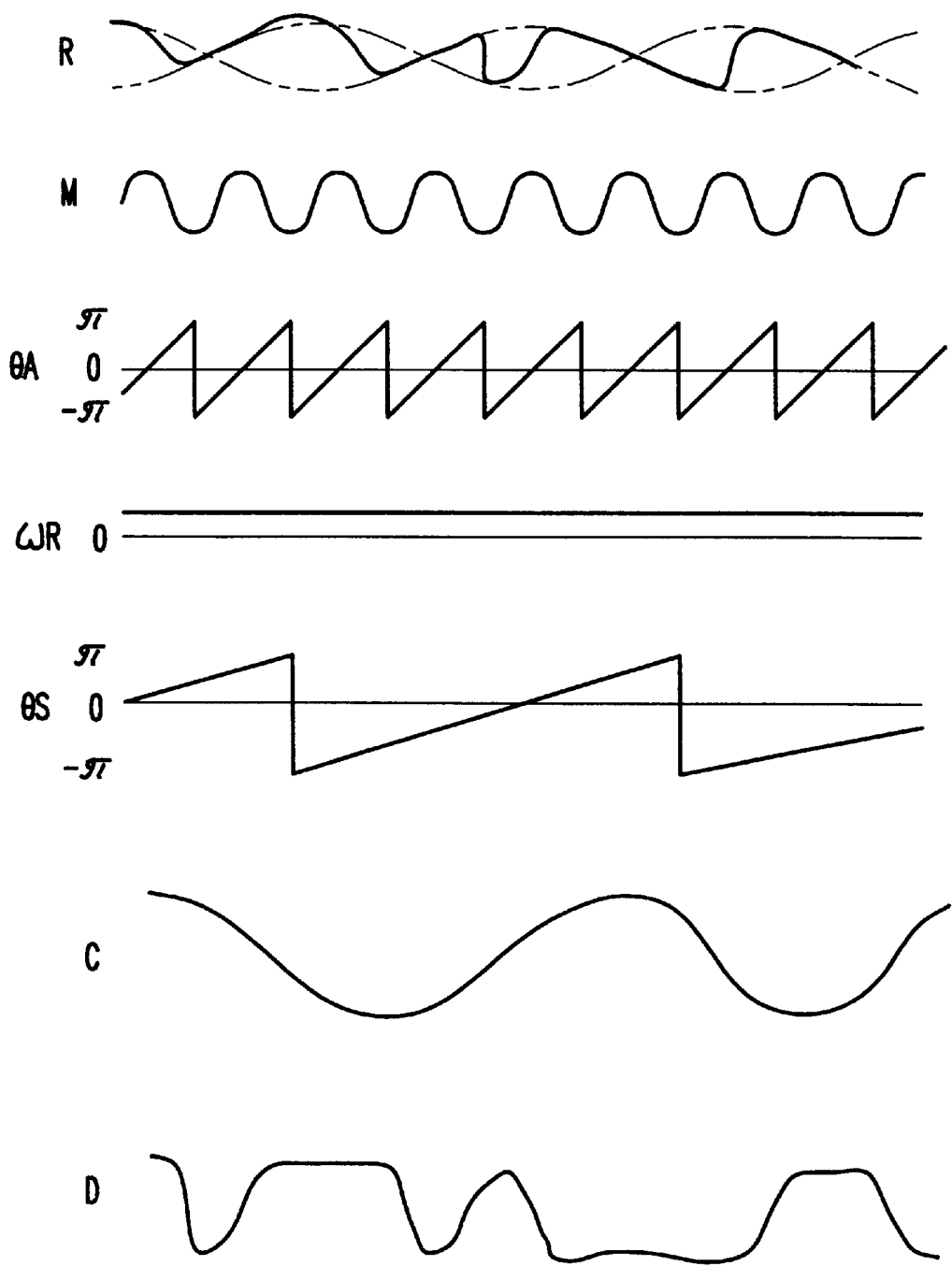
FIG. 2 is a signal waveform chart illustrating the operation of each circuit component of the phase shift keying signal demodulation circuit shown in FIG. 1.
Figure 3:
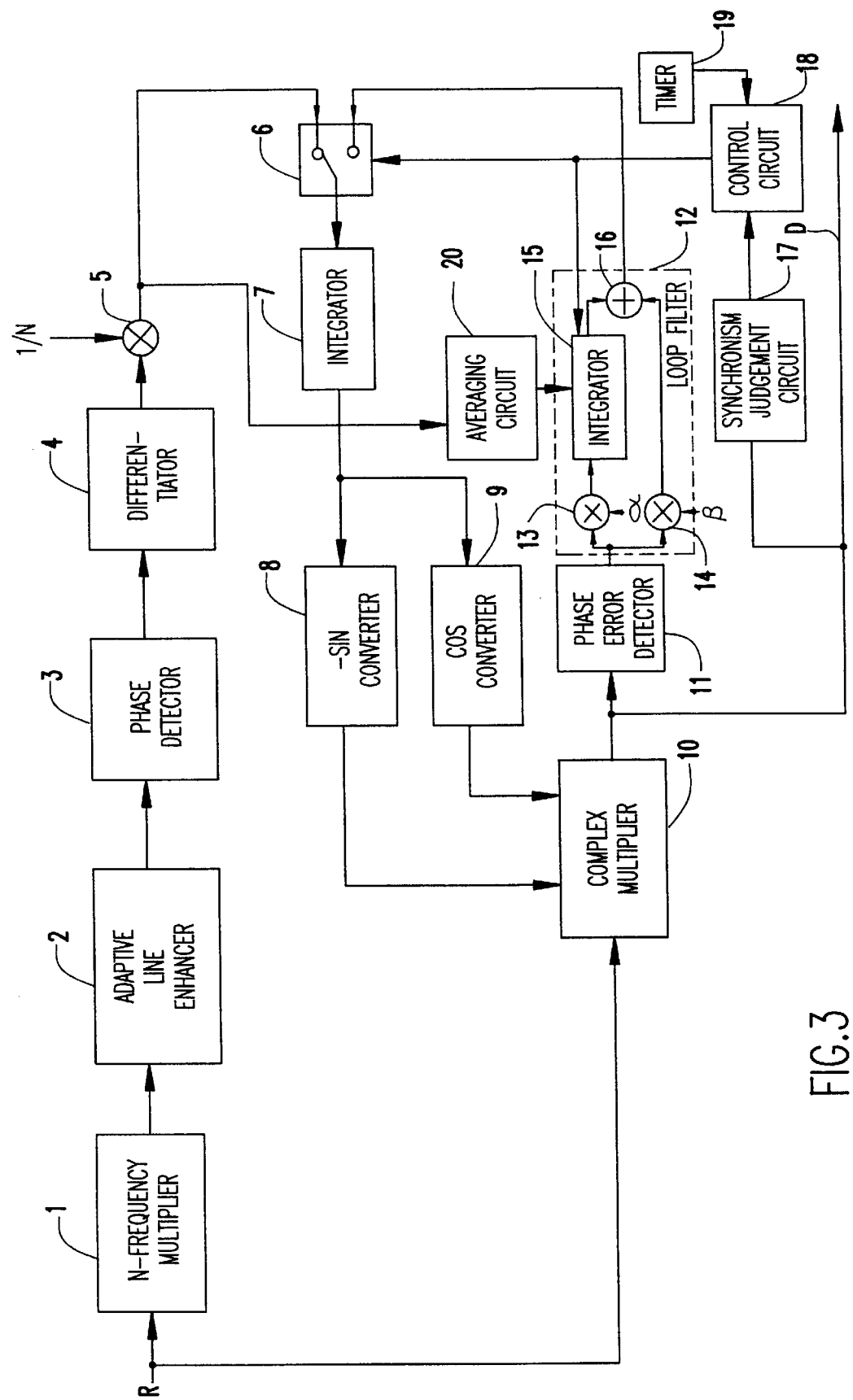
FIG. 3 is a block diagram showing one example of an embodiment of a phase shift keying signal demodulation device for realizing the phase shift keying signal demodulation method of the present invention.
Figure 4:
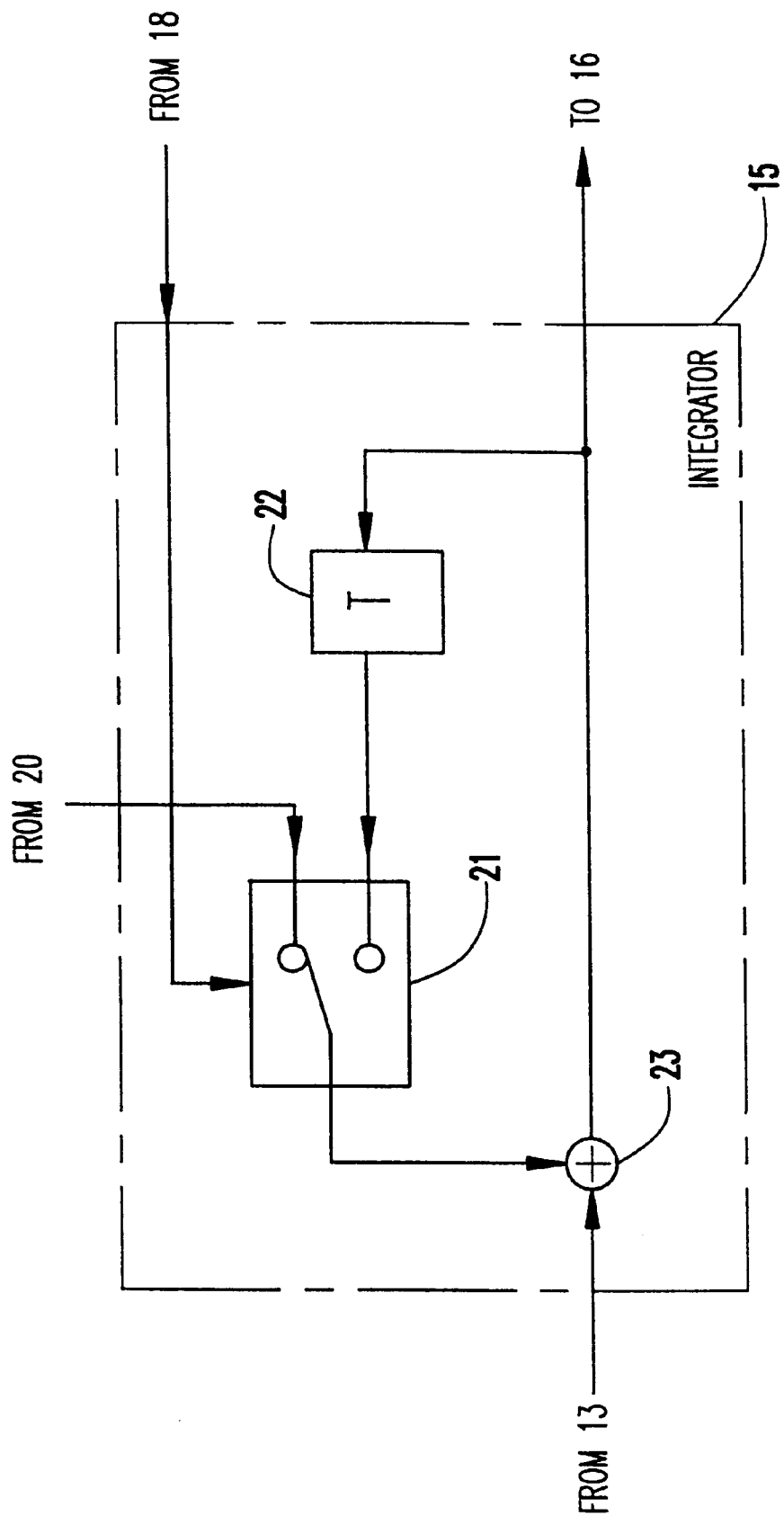
FIG. 4 is a structural view of the integrator of the proportional integration filter in the embodiment shown in FIG. 3.

FIG. 3 is a block diagram showing an example of the embodiment of a phase shift keying signal demodulation device for realizing the phase shift keying signal demodulation method of the present invention. FIG. 4 is a structural diagram showing the integrator of the proportional integration filter of the embodiment shown in FIG. 3. The phase shift keying signal demodulation device of this embodiment comprises a first PSK signal demodulation circuit, a second PSK signal demodulation circuit, a switching circuit that switches between the first and second PSK signal demodulation circuits, and an initial value supply circuit.

The first PSK signal demodulation circuit (hereinbelow referred to as the "first demodulation circuit") is provided with the same construction as the adaptive line enhancing PSK demodulation circuit described in the foregoing explanation of the prior art, and performs the same operation. The second PSK signal demodulation circuit (hereinbelow referred to as the "second demodulation circuit") is a PLL-type PSK demodulation circuit.

The second demodulation circuit shares with the first demodulation circuit an integrator 7, a sin-cos converter provided with −sin converter 8 and cos converter 9, and a complex multiplier 10. The second demodulation circuit is additionally provided with phase error detector 11 and proportional integration filter (loop filter) 12. Phase error detector 11 inputs the demodulation signal and outputs a phase error signal that corresponds with the phase error of the demodulation signal. Here, "phase error" refers to the demodulation signal phase error that occurs due to lack of total synchronization between the phase of the carrier of the inputted PSK signal ($\theta(t)$ of equation (1)) and recovered carrier ($\theta(t)$ of equation (6)). In other words, this phase error is the residual phase error following demodulation.

Proportional integration filter 12 is provided with multiplier 14, multiplier 13, integrator 15, and adder 16. Multiplier 14 inputs the phase error signal, and multiplies the inputted phase error signal by a variable proportional constant $\beta$ (proportional operation). Multiplier 13 multiplies the phase error signal by a variable constant $\alpha$. Integrator 15 integrates the output of multiplier 13 using as initial value an angular frequency supplied by way of an initial value supply circuit (to be explained) when the demodulation circuit is switched from the first demodulation circuit to the second demodulation circuit (integration operation). Adder 16 adds the results of the proportional operation and the results of the integration operation, outputs the addition result as a recovered carrier angular frequency signal, and inputs to integrator 7.

The switching circuit is provided with selector 6 and a synchronization judgment control circuit that is in turn provided with synchronism judgment circuit 17, control circuit 18, and timer 19. Synchronism judgment circuit 17 inputs a demodulation signal generated by the first demodulation circuit at the time of initial input of the N-phase PSK signal, judges whether phase synchronization (demodulation synchronization) has been established between the N-phase PSK signal and the recovered carrier, and notifies control circuit 18. When demodulation synchronization has been established, control circuit 18 outputs a switching control signal upon the passage of a prescribed time interval following establishment of demodulation synchronization. Timer 19 times this prescribed time interval. While a switching control signal has not been outputted, selector 6 connects the output of multiplier 5 of the first demodulation circuit to integrator 7, and when a switching control signal has been outputted, connects the output of proportional integration filter 12 of the second demodulation circuit to integrator 7.

The initial value supply circuit is provided with averaging circuit 20 and selector 21 (refer to FIG. 4). Averaging circuit 20 calculates a time average of angular frequency $\omega_R(t)$ (see equation (5)) outputted from multiplier 5 of the first demodulation circuit. When a switching control signal is outputted from control circuit 18, selector 21 connects the output of averaging circuit 20 to the integration circuit of integrator 15 of proportional integration filter 12, and loads the sliding average of angular frequency $\omega_R(t)$ as the initial value of integration to integrator 15.

As shown in FIG. 4, integrator 15 is provided with selector 21 and a digital integration circuit that is in turn provided with 1-clock delay circuit (hereinbelow referred to as a "delay circuit") 22 and adder 23. When a switching control signal is outputted, selector 21 connects the output of averaging circuit 20 to adder 23 for the interval of one clock. Upon passage of this one clocks selector 21 connects the output of delay circuit 22 to adder 23. Accordingly, after output of a switching control signal, the output of averaging circuit 20 is loaded to adder 23 as the initial integration value in the interval of the first clock, and following passage of the first clock, a known digital integration circuit is constituted from adder 23 and delay circuit 22.

Operation

Next, the operation of the present embodiment will be described.

At the time that the phase shift keying signal demodulation device initially receives the incoming N-phase PSK signal, a switching control signal has not been outputted from control circuit 18, and selector 6 therefore connects the output of multiplier 5 to integrator 7. As a result, connection is completed for the first demodulation circuit, the second demodulation circuit is cut off from the signal pass, and the phase shift keying signal demodulation device operates as the adaptive line enhancing PSK signal demodulation circuit described in the prior art.

Synchronism judgment circuit 17 performs judgment of demodulation synchronization using the first demodulation circuit, and once demodulation synchronization is established, sends a "synchronization established" signal from synchronism judgment circuit 17 to control circuit 18 indicating that phase synchronization has been achieved. After receiving the "synchronization established" signal, control circuit 18 causes selector 6 to cut off the connection between the output of multiplier 5 and integrator 7 after the passage of the prescribed time interval that is timed by timer 19, and to connect the output of proportional integration filter 12 to integrator 7.

Simultaneously with this switching, control circuit 18 controls selector 21 (see FIG. 4) such that the output of averaging circuit 20 is loaded to adder 23 of the integration circuit for the interval of one clock, and upon passage of one clock, the connection between the output from averaging circuit 20 and adder 23 of the integration circuit is cut off, and adder 23 of the integration circuit is connected to the output of delay circuit 22.

After the above-described control by control circuit 18, the second demodulation circuit operates as a secondary PLL demodulation circuit beginning with complex multiplier 10 and continuing to phase error detector 11, to proportional integration filter 12, to selector 6, to integrator 7, to sin-cos converters 8 and 9, and to complex multiplier 10.

Phase error detector 11 detects the residual phase error of demodulation signal D(t) outputted from complex multiplier 10 and outputs the residual phase error as a phase error signal. The phase error signal undergoes a proportional integration operation by proportional integration filter 12 using as the initial value the average value of the carrier angular frequency generated by the first PSK signal demodulation circuit at the time of switching from the first PSK signal demodulation circuit to the second PSK signal demodulation circuit. The output of proportional integration filter 12 is added by integrator 7 for every clock and the results of addition fed back to sin-cos converters 8 and 9 for each clock.

The output of integrator 7 pertains to the phase for demodulation of the second demodulation circuit (PLL demodulation circuit), and the output of proportional integration filter 12 pertains to the angular frequency for demodulation (recovered angular frequency). However, the phase for demodulation (recovered phase angle) of the second demodulation circuit is not generated without relation to the demodulation phase generated by the first demodulation circuit at the time of demodulation synchronization pull-in. Continuity can be maintained despite switching of the demodulation circuit from the first PSK signal demodulation circuit to the second PSK signal demodulation circuit because there remains in integrator 7 the $\theta_S(t)$ of the demodulation synchronization pull-in process preceding output of a switching control signal by control circuit 18. Furthermore, the value that is the output value $\omega_R(t)$ of multiplier 5 averaged at averaging circuit 20, i.e., the averaged value of the recovered angular frequency, is loaded to integrator 15.

Accordingly, this demodulation circuit can begin operation in a state of demodulation synchronization from the very start following a switch of the demodulation circuits. In addition, in the PLL demodulation circuit of this embodiment, the loop band can be made as narrow as required by merely changing the values of multiplication constants $\alpha$ and $\beta$ used in multipliers 13 and 14 within proportional integration filter 12, and as a result, stable demodulation operation can be realized without enlarging the scale of the circuit.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A phase shift keying signal demodulation method, comprising the steps of:
   a demodulated signal from an input N-phase PSK (Phase Shift Keying) signal by first recovering a carrier using a first carrier recovery method until phase synchronization is established between said input N-phase PSK signal and a recovered carrier, and
   switching to a second carrier recovery method to recover a carrier after establishing said phase synchronization, said first carrier recovery method comprising the steps of:
   N-frequency multiplying said input N-phase PSK signal to eliminate a modulation component;
   passing said N-frequency multiplied signal through a band-pass filter adapted to a line component of said signal to generate an adaptive line enhanced signal in which said line component is enhanced;
   N-frequency dividing said adaptive line enhanced signal to generate a recovered carrier angular frequency signal that indicates an angular frequency of a recovered carrier;
   integrating said recovered carrier angular frequency signal to calculate a phase angle of said recovered carrier for demodulation use; and
   calculating a $-\sin$ function value and a cos function value corresponding to said phase angle to generate a recovered carrier for demodulation;
   said second carrier recovery method comprising the steps of:
   generating a phase error signal that indicates residual phase error of a demodulated signal;
   performing a proportional calculation by multiplying said phase error signal by a first constant;
   performing an integration calculation wherein said phase error signal is multiplied by a second constant and the multiplication result is integrated using as an initial value said angular frequency generated by said first carrier recovery method when switching from said first carrier recovery method to said second carrier recovery method;
   executing a proportional integration operation wherein said proportional calculation result and said integration calculation result are added wherein the result of said proportional integration operation is made a recovered carrier angular frequency signal;
   integrating said recovered carrier angular frequency signal to calculate the phase angle of the recovered carrier for demodulation; and
   calculating a $-\sin$ function value and cos function value corresponding to said phase angle to generate a recovered carrier for demodulation.

2. A phase shift keying (PSK) signal demodulation device comprising:
   a first phase shift keying signal demodulation circuit;
   a second phase shift keying signal demodulation circuit; and
   switching means for switching between said first and second phase shift keying signal demodulation circuits,
   said first phase shift keying signal demodulation circuit comprises:
   an N-frequency multiplier that N-frequency multiplies an angular frequency of an inputted N-phase PSK signal;
   an adaptive line enhancer that adapts to a line component of output of said N-frequency multiplier and outputs a signal in which said line component is enhanced;
   a phase detector that detects phase of output of said adaptive line enhancer;
   a differentiator that differentiates output of said phase detector;
   frequency dividing means for multiplying an output of said differentiator by 1/N and generating a recovered carrier angular frequency signal corresponding to the angular frequency of a recovered carrier;
   an integrator that adds said recovered carrier angular frequency signal for every clock signal and outputs the result as the phase angle of said recovered carrier for every clock signal;
   a sin-cos converter that converts output of said integrator to a $-\sin$ function value and a cos function value; and
   a complex multiplier that multiplies output of said sin-cos converter and said inputted N-phase PSK signal as complex numbers and outputs a demodulation signal;
   wherein said second phase shift keying signal demodulation circuit shares said integrator, said sin-cos converter, and said complex multiplier with said first phase shift keying signal demodulation circuit, said second phase shift keying signal demodulation circuit comprises:

a phase error detector that inputs said demodulation signal and outputs a phase error signal corresponding to residual phase error of said demodulation signal; and a proportional integration filter that inputs said phase error signal, executes a proportional operation in which said phase error signal is multiplied by a first constant and an integration operation in which said phase error signal is multiplied by a second constant and the multiplication result of multiplying by said second constant is integrated using as initial value said angular frequency generated by said first phase shift keying signal demodulation circuit when switching from said first phase shift keying signal demodulation circuit to said second phase shift keying signal demodulation circuit, executes a proportional integration operation in which the result of said proportional operation and the result of said integration operation are added, and outputs the result of this proportional integration operation to said integrator as a recovered carrier angular frequency signal, and said switching means switches said first and second phase shift keying signal demodulation circuits such that, upon initial input of said N-phase PSK signal, demodulation is effected by said first phase shift keying signal demodulation circuit until phase synchronization is established between said inputted N-phase PSK signal and a recovered carrier, and demodulation is effected by said second phase shift keying signal demodulation circuit following establishment of said phase synchronization.

3. A phase shift keying signal demodulation device according to claim 2 wherein said switching means comprises:

a synchronization judgment control circuit that inputs said demodulation signal, judges establishment of phase synchronization between said N-phase PSK signal inputted to said phase shift keying signal demodulation device and a recovered carrier, and, when said phase synchronization is established, outputs a switching control signal after the passage of a prescribed interval following establishment of synchronization; and first selection means that, in response to said switching control signal, connects to said integrator either output of said frequency dividing means of said first phase shift keying signal demodulation circuit or output of said proportional integration filter of said second phase shift keying signal demodulation circuit.

4. A phase shift keying signal demodulation device according to claim 2 wherein said second phase shift keying signal demodulation circuit comprises an averaging circuit that time-averages output of said frequency dividing means of said first phase shift keying signal demodulation circuit; and said proportional integration filter comprises second selection means that connects output of said averaging means to said proportional integration filter as said initial value when a switching control signal is outputted from said switching means.

* * * * *